US005773826A

United States Patent [19]

Castleman et al.

[11] Patent Number: 5,773,826

[45] Date of Patent: Jun. 30, 1998

[54] FLAME DETECTOR AND PROTECTIVE COVER WITH WIDE SPECTRUM CHARACTERISTICS

[75] Inventors: David A. Castleman, Claremont; Chris A. Selstad, Fullerton, both of Calif.

[73] Assignee: Fire Sentry Systems Inc., Cleveland, Ohio

[21] Appl. No.: 609,740

[22] Filed: Mar. 1, 1996

[51] Int. Cl.[6] .......... G01J 5/02

[52] U.S. Cl. .......... 250/339.15; 250/339.14

[58] Field of Search .......... 250/339.15, 339.14, 250/339.01; 340/578

[56] References Cited

U.S. PATENT DOCUMENTS

| | | | |
|---|---|---|---|
| 4,317,045 | 2/1982 | Coe et al. | 250/554 |
| 4,701,624 | 10/1987 | Kern et al. | 250/554 |
| 4,742,236 | 5/1988 | Kawakami et al. | 250/554 |
| 5,311,167 | 5/1994 | Plimpton et al. | 250/339.01 |

FOREIGN PATENT DOCUMENTS

| | | |
|---|---|---|
| 0159798 | 10/1985 | European Pat. Off. . |
| 0175032 | 3/1986 | European Pat. Off. . |
| 0618555 | 10/1994 | European Pat. Off. . |
| 2012092 | 7/1979 | United Kingdom . |

*Primary Examiner*—David P. Porta
*Assistant Examiner*—Richard Hanig
*Attorney, Agent, or Firm*—Lyon & Lyon LLP

[57] ABSTRACT

The present invention relates to a flame detector and protective cover with wide spectrum characteristics. The novel flame detector has wide spectrum sensitivity, which facilitates increased sensitivity to any sign of a flame or fire. The protective cover has wide spectrum transmittance characteristics. The protective cover facilitates reduced cleaning requirements and less disruption of the automated process for cleaning purposes. The wide spectrum transmittance characteristics of the protective cover enable it to be used with any flame detector utilizing non-ultraviolet sensing techniques.

16 Claims, 5 Drawing Sheets

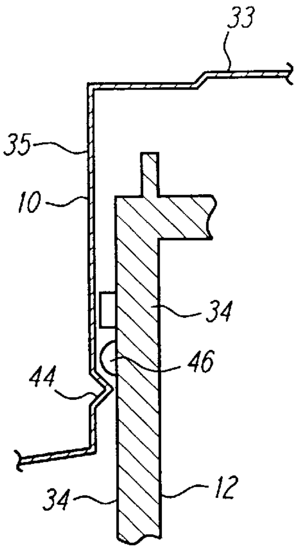
FIG. 4
FIG. 3
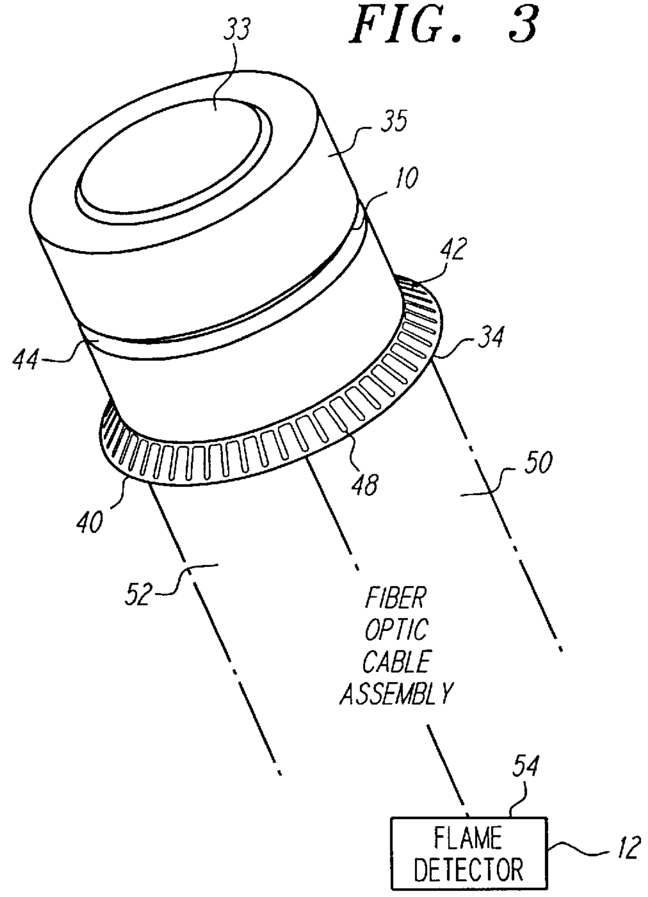
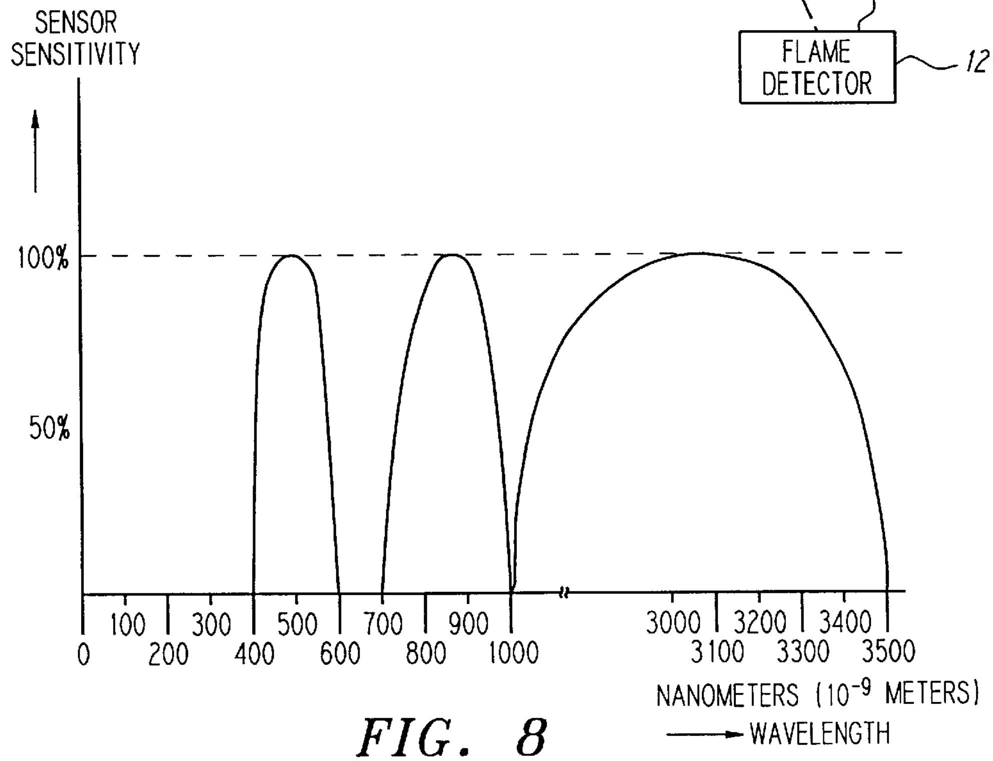
FIG. 8

FLAME DETECTOR AND PROTECTIVE COVER WITH WIDE SPECTRUM CHARACTERISTICS

FIELD OF THE INVENTION

This invention relates generally to fire detection in any environment facing a fire threat, as for example, during electrostatic coating or painting (liquid or powder) operations of parts in a production line. More specifically, this invention relates to a novel flame detector with increased wide spectrum sensitivity, to any sign of a flame or fire. This invention also relates to a protective cover with wide spectrum transmittance characteristics. The protective cover facilitates reduced cleaning requirements and less disruption of the automated process for cleaning purposes. The wide spectrum transmittance characteristics of the protective cover enable it to be used with any flame detector utilizing non-ultraviolet sensing techniques.

BACKGROUND OF THE INVENTION

To prevent fires, and the resulting loss of life and property, the use of flame detectors is not only voluntarily adopted in many situations, but, is also required by the appropriate authority with jurisdiction for implementing the National Fire Protection Association's (NFPA) codes, standards, and regulations. Facilities faced with a threat of fire, such as petrochemical facilities and refineries, co-generation plants, aircraft hangers, silane gas storage facilities, gas turbines and power plants, gas compressor stations, and so on, are examples of environments, which require constant flame detection.

To appreciate the significance of the fire detection system proposed in this application, an exemplary environment, where electrostatic coating or spraying operations are performed, is explained in greater detail. However, it should be understood that the invention may be practiced in any environment faced with a threat of fire.

Electrostatic coating or spraying is a popular technique for large scale application of paint, as for example, in a production painting line. Electrostatic coating or spraying involves the movement of very small droplets of electrically charged "liquid" paint or particles of electrically charged "powder" paint from a electrically charged (40 to 120,000 volts) nozzle to the surface of a part to be coated. Most industrial operations use conventional air spray systems in which compressed air is supplied to a spray gun and to a paint container. At the gun, the compressed air mixes, somewhat violently, with the paint, causing it to break up into small droplets, which are propelled toward the surface of the part to be coated. The parts to be coated are transported through a coating zone by a mechanical conveyor, operated at ground potential.

Electrostatic coating of parts in a production paint line, while facilitating efficiency, environmental benefits, and many production advantages, presents an environment fraught with explosive fire hazards and safety concerns. For example, sparks are common from improperly grounded workpieces or faulty spray guns. In instances where the coating material is a paint having a volatile solvent, the danger of an explosive fire from sparking, or arcing, is, in fact, quite serious. Fires are also a possibility if electrical arcs occur between charged objects and a grounded conductor in the vicinity of flammable vapors.

Thus, in the present and the past, flame detectors have routinely been located at strategic positions in spray booths, to monitor any ignition that may occur, and to shut down the electrostatics, paint flow to the gun, and conveyors in order to cut-off the contributing factors leading to the fire.

A fire occurs because of three contributing factors: 1) fuel, such as, atomized paint spray, solvents, and paint residues; 2) ignition temperature derived from electrostatic corona discharges, sparking, and arcing from ungrounded workpieces, and so on; and 3) oxygen derived from the surrounding air. When a fuel's ignition temperature rises in the presence of oxygen, a fire occurs.

In many cases, when the fuel supply or the reason for the rise in ignition temperature is eliminated, the fire self-extinguishes. If the fire does not self-extinguish, flame detectors activate suppression agents to extinguish the fire to prevent major damage.

Flame detectors, which are an integral part of industrial operations such as the one described above, must meet standards set by the NFPA, which are becoming increasing stringent. Thus, increased sensitivity, faster reaction times, and fewer false alarms are becoming necessary. Flame detectors currently on the market have many drawbacks. They can only sense radiant energy in one or more of either the ultraviolet, visible, or the near band infrared (IR) spectrum.

In a related context, although flame detectors provide the security of avoiding fires, they perform at their optimum, only if their viewing windows are kept clean. Given their surrounding environment, keeping the viewing windows clean is difficult. The paint mist in the spray booth, oil contaminants and grime, accumulate in a very short time on a viewing window of a flame detector. For optimum performance, the viewing window must be clear. An unclear viewing window degrades the sensing capabilities of flame detectors.

Frequent cleaning, although necessary, is undesirable and expensive because of the manual labor it involves and hinderance of the automated process. Typically, the coating or spraying operations must come to a halt to facilitate cleaning. In addition, the cleaning itself is a laborious and unpleasant task, with some risk. Typically, the viewing window of the flame detector lies within a recessed area, which makes it more difficult to clean. Moreover, the flame detector itself is located high above the floor, in an area not easily accessed. The cleaning task typically requires a ladder and two people, often union members. Furthermore, in most flame detector configuration types (for example, see FIG. 2), some disassembly is required, to ensure thorough cleaning. For purposes of illustration, just the cost of maintaining a "single" flame detector clean can add up to about $40,000 per year. Besides this, disrupting the automated painting has tremendous financial setbacks.

Thus, improved flame detectors and a way to ensure their optimum performance, with little or no interruptions in the automated industrial operations, such as coating or spraying, are desirable.

SUMMARY OF THE INVENTION

The present invention relates to a flame detector and protective cover with wide spectrum characteristics. The novel flame detector has wide infrared spectrum sensitivity, which facilitates increased sensitivity to any sign of a flame or fire. The protective cover has wide spectrum transmittance characteristics. The protective cover facilitates reduced cleaning requirements and less disruption of the automated process for cleaning purposes. The wide spectrum transmittance characteristics of the protective cover enable it to be used with any flame detector utilizing non-ultraviolet sensing techniques.

In accordance with one embodiment of the present invention, the flame detector has wide infrared spectrum sensitivity to detect any sign of flame or fire and the protective cover has wide spectrum transmittance characteristics. A microcomputer located internally within the fire detector or externally of it, processes data supplied by sensors for detecting radiant energy within the visible band, near band infrared, and wide infrared spectrums. An externally located controller is also provided for further processing of data.

The protective cover is constructed from a material, which is relatively inexpensive. Thus, the protective cover may be easily disposed, recycled, or reused, as desired. To avoid accumulation of paint and grime on a viewing window, the protective cover is configured to slip easily over the flame detector. As seen in FIG. 1, the protective cover 10 is configured like a top hat, with a planar face and a cylindrical body portion terminating, at its base, in a perpendicular flange. A centrally located groove runs along the circumference of its body portion. Slight pressure causes the groove to slide over the locking mechanism of the flame detector and hold the protective cover in place. The flange has a plurality of reinforcing grooves, that lend the flange enough rigidity, to allow a person to easily pull it off the flame detector, when replacing it with another.

These and other features of the protective cover with wide spectrum transmittance characteristics will become apparent in the detailed description that follows.

BRIEF DESCRIPTION OF THE DRAWING FIGURES

FIG. 3 is a diagrammatic illustration of a flame detector for use with a fiber optic cable assembly to facilitate its use in confined or unaccessible areas and a scaled down version of the protective cover for use with the fiber optic cable;

FIG. 4 is a cross-sectional view taken along line 4-4 through FIGS. 1 and 2;

FIG. 8 is a graphical representation of the sensitivity of sensors of the flame detector in accordance with an alternative embodiment of the invention.

DETAILED DESCRIPTION OF A PREFERRED EMBODIMENT

Figure 1:
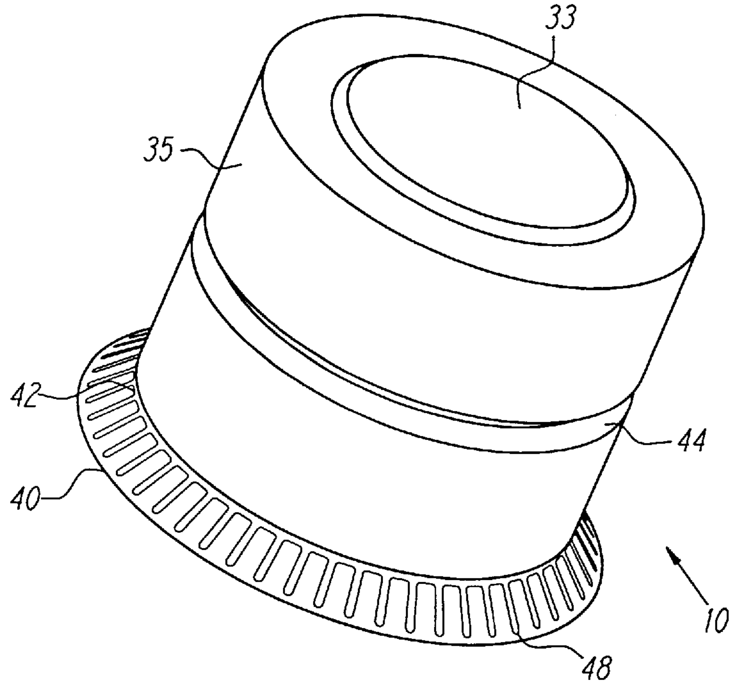
FIG. 1 is a perspective view of a protective cover with wide spectrum transmittance characteristics in accordance with the present invention.

FIG. 1 illustrates an exemplary configuration of a protective cover with wide spectrum transmittance characteristics, indicated generally by reference numeral 10, for use with a flame detector (FIG. 2) indicated generally by reference numeral 12. Many types of detectors for sensing a flame or fire currently exist, such as single and dual frequency ultraviolet (UV), infrared (narrow band) (IR), and UV/IR flame detectors. The narrow band infrared flame detectors of the prior art only detect radiant energy (4.3 micrometers) emitted by hot $CO_2$ gases discharged by a hydrocarbon fire. The flame detector 12 in accordance with the present invention is sensitive to radiant energy in the visible band, near band infrared, and wide infrared spectrums. The flame detector 12 has a spectrum sensitivity for infrared energy, within a range from 700–5000 nanometers (0.7 to 5 micrometers) and for visible energy, within a range from 400 to 700 nanometers.

Figure 2:
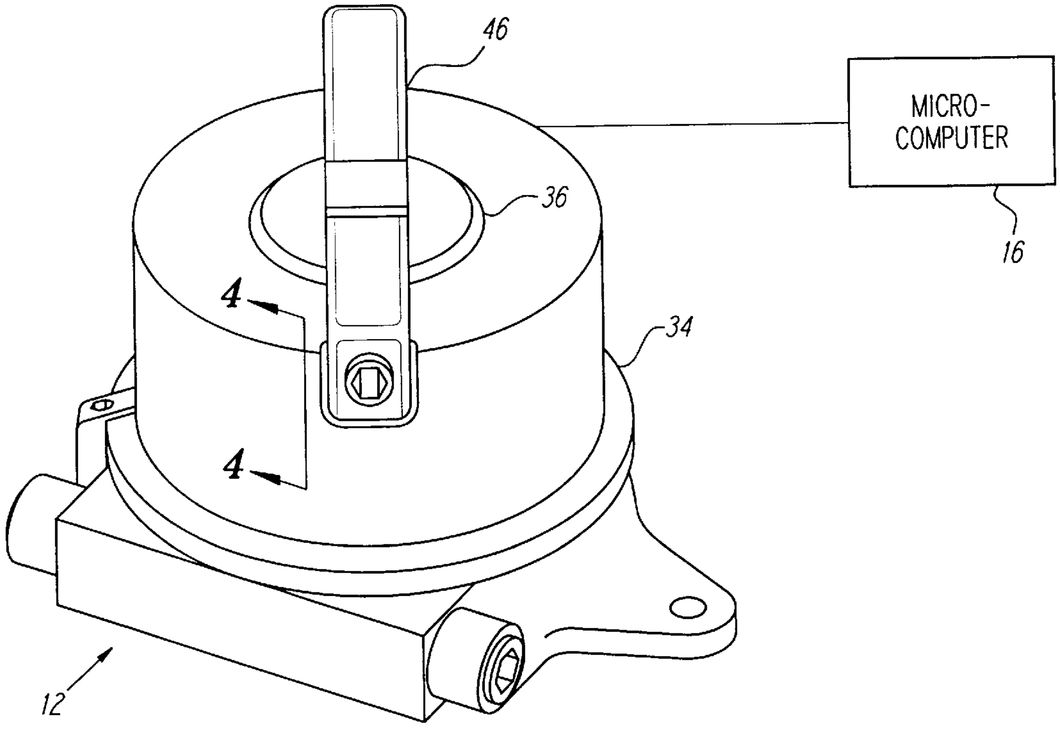
FIG. 2 is a perspective view of a flame detector with wide spectrum sensitivity in accordance with the present invention.

The flame detector 12 operates by searching for radiant energy characteristics or patterns of a flame or fire. The continuous stream of spectrum data from a sensor array 14 (see FIG. 5) is analyzed by a microcomputer 16. In FIG. 2, the microcomputer 16 is shown external to the housing of the flame detector 12 for purposes of illustration only. The flame detector and its housing are both indicated by reference numeral 12. The microcomputer 16 is located within the flame detector 12. However, for certain applications, it may be desirable to locate it externally. The microcomputer 16 has a non-volatile memory indicated at 18 (see FIG. 5).

Figure 5:
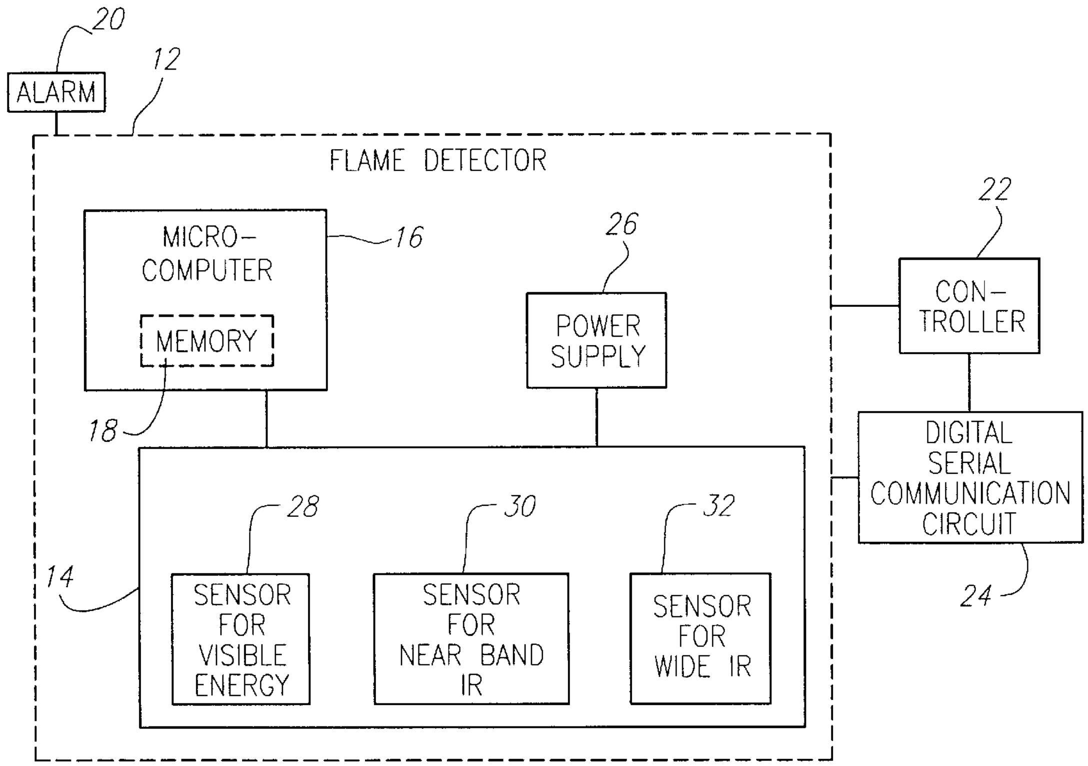
FIG. 5 is a block diagram illustrating the system (hardware and software) components of the flame detector of the present invention shown in FIG. 2.

Referring to FIG. 5, in accordance with one approach to detecting radiant energy from a flame or fire, the microcomputer 16 analyzes the continuous stream of data provided by the sensor array 14 and compares it with characteristics of fire signatures or false alarm models, such as for example, looking for a flicker. The fire signatures or false alarm models are compiled and stored in the memory 18. When the data provided by the sensor array 14 matches the characteristics of a stored fire signature model, within certain parameters, the flame detector 12, declares an alarm condition by activating an alarm relay, indicated at 20. Upon declaring an alarm condition, the flame detector 12 stores all the pre-fire spectrum data provided by the sensor array 14 in the non-volatile memory 18 for subsequent retrieval and evaluation. An external controller 22 (see FIG. 5) is provided for further processing of data as needed, such as for diagnostic evaluations and so on. A digital serial communication circuit 24 (see FIG. 5) controls serial connections of one or more of a plurality of flame detectors 12 to the controller 22 to ensure clear communication through the otherwise noisy environment. A power supply 26, typically operating at 24 volts, supplies power to the flame detector 12.

Figure 6:
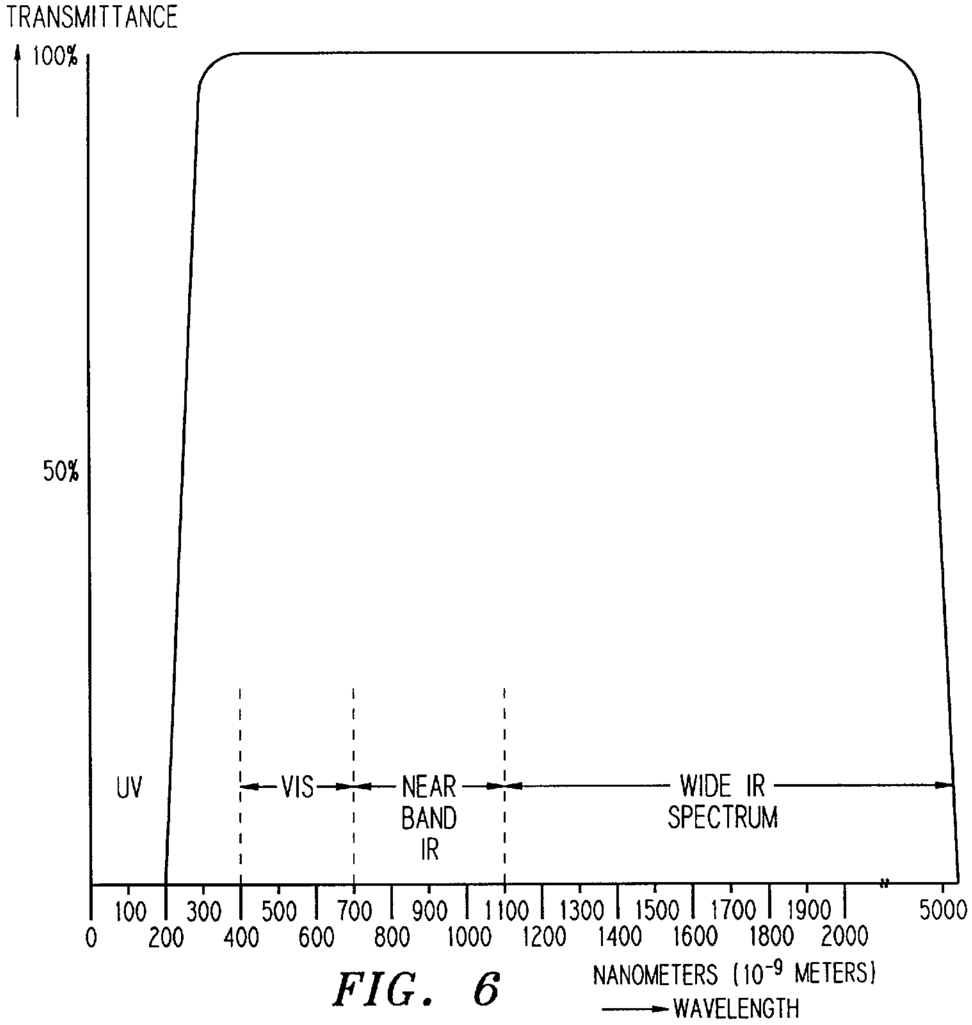
FIG. 6 is graphical representation of the wide spectrum sensitivity of the flame detector and the transmittance characteristics of the protective cover.

The sensor array 14 has a sensor 28 for sensing radiant energy within the visible band spectrum, a sensor 30 for sensing radiant energy within the near band infrared spectrum, and a sensor 32 for sensing radiant energy within a wide infrared spectrum. Referring also to FIG. 6, the sensor 28 searches for and detects radiant energy within the visible band range extending from 400 nanometers to 700 nanometers, and indicated in FIG. 6 as "VIS." The sensor 30 searches for and detects radiant energy within the near band infrared range extending from 700 nanometers to 1100 nanometers, and indicated as in FIG. 6 as "NEAR BAND IR." The sensor 32 searches for and detects radiant energy within a wide infrared range extending from 700 nanometers to 5000 nanometers, and indicated in FIG. 6 as "WIDE IR SPECTRUM."

Figure 7:
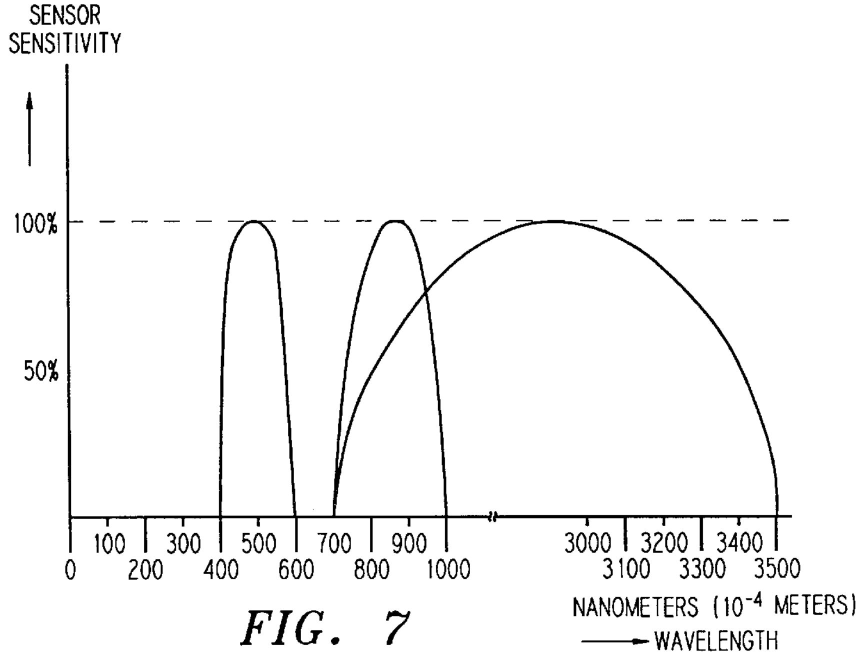
FIG. 7 is a graphical representation of the sensitivity of sensors of the flame detector in accordance with one embodiment of the invention.

Referring now to FIGS. 7 and 8, sensor sensitivities and sensor types that are used in the flame detector 12 are illustrated. However, it should be understood that a variety of different sensors may be used in different configurations to accomplish the same purpose. In accordance with one illustrated embodiment (FIG. 7), suitable silicon (Si) photodiode sensors are used for detecting radiant energy within the visible band and near band infrared spectrums. The wavelength (in nanometers) of the radiant energy is indicated along the x-axis and the sensor sensitivity in relative percentage is indicated on the y-axis. For a wide infrared spectrum, a suitable lead sulphide (PbS) sensor is used. With reference specifically to FIG. 8, in accordance with an alternative embodiment, a Germanium photodiode sensor may be sandwiched on top of the lead sulphide (PbS) sensor.

So as not to obstruct the wide spectrum sensitivity of the flame detector 12, the protective cover 10 (FIG. 1) has wide spectrum transmittance characteristics, which enable optimum sensing of any ignition that may occur. The transmittance characteristics of the protective cover 10 are also illustrated in FIG. 6.

Returning now to FIGS. 1 and 2 and additionally FIG. 4, the protective cover 10, which appears somewhat like a top hat is configured to conform around a cylindrical protruding portion 34 of the flame detector 12. In order to prevent accumulation of spray paint, grime, oil contaminants, or the like, on a viewing window 36 of the flame detector housing 12, the protective cover 10 completely covers the viewing window 36. The protective cover 10 has a planar face 33 and a cylindrical body 35. The cylindrical body 35 extends sufficiently along the protruding portion 34 and is sufficiently detached from it to prevent any movement of airborne paint particles toward the viewing window 36.

As specifically illustrated in FIGS. 1 and 4, the cylindrical body 35, at its base 42, terminates in a perpendicularly projecting flange 40. The flange 40 also serves to prevent airborne paint particles from moving toward the viewing window 36. A centrally located groove 44 runs along its circumference, almost contacting the protruding portion 34 of the flame detector 12. That again further keeps airborne paint particles from making their way toward the viewing window 36. Slight pressure applied on the protective cover 10, to ease the protective cover 10 over the flame detector 12, causes the groove 44 to slide over a locking mechanism 46 of the flame detector (best illustrated in FIG. 4). The groove 44 serves to hold the protective cover 10, albeit flexibly, in place.

The flange 40, has a plurality of reinforcing members 48, projecting outwardly, toward its outer periphery. The reinforcing members 48 lend the flange 40 enough rigidity, to allow a person to easily pull it off the flame detector 12 when replacing it with another.

The protective cover 10 is constructed from any suitable material having the required transmittance characteristics. The material used in the illustrated embodiment is relatively inexpensive, has some rigidity, yet is also resilient. In the illustrated embodiment of the protective cover 10, a clear polyvinyl chloride (PVC), with a "ORVIS®-K" coating to serve as an anti-static agent is used. The protective cover 10 is fabricated from clear PVC, preferably, with a starting gauge of 20 mil, and vacuum drawing it over a machined, metal mold to yield thin, flexible protective covers. The protective cover 10 may alternatively be fabricated from materials such as LEXAN®, which may be injection molded. Injection molding is a more expensive process and therefore, is not as practical. Other plastics with similar transmittance characteristics may alternatively be used. The illustrated protective cover 10 may be easily disposed, recycled, or reused after cleaning, as desired.

Alternatively, the protective cover 10 may be configured as a bag or a planar surface in whatever shape or form to cover the viewing window 36 with a string or wire to fasten it to the protruding portion 34 of the flame detector 12.

Referring now to FIG. 3, the protective cover 10 may vary in dimensions to suit various applications. Flame detectors are routinely used in confined areas, such as cabinets, processing equipment including mixers of explosive materials, extruders, etc. For example, a small, almost miniature, version of the protective cover 10 (FIG. 3), may be used at a viewing end 52 of a fiber optic cable 50, attached at its other end 54 to a flame detector 12. Use of the fiber optic cable 50 would facilitate remote location of the flame detector 12 and enable transmission of all the radiant energy patterns detected to the flame detector 12.

While the invention has been described in conjunction with specific embodiments thereof, many alternatives, modifications and variations will be apparent to those skilled in the art in view of the foregoing description. Accordingly, it is intended to embrace all such alternatives, modifications and variations which fall within the spirit and scope of the appended claims.

What is claimed is:

1. A protective cover for use with a flame detector disposed within a housing having a viewing window, said flame detector with sensitivity for a visible band, near band infrared, and a wide infrared spectrums, said protective cover for preventing accumulation of paint, grime or the like on the viewing window, comprising:

a one-piece configuration shaped to completely surround said viewing window, said one-piece configuration having wide spectrum transmittance characteristics that transmit radiant energy in said visible band, said near band, and said wide infrared spectrums to which said flame detector is sensitive.

2. A protective cover according to claim 1, wherein said one-piece configuration further comprising:

a circular portion with a groove running along its circumference; and a flange located at a base of said circular portion with a plurality of reinforcing members.

3. A protective cover for use with a flame detector according to claim 1, wherein said wide spectrum transmittance characteristics of said one-piece configuration accommodate transmission of radiant energy including visible and infrared (IR) energy within a range of 700 nanometers to 5 nanometers.

4. A protective cover for use with a flame detector according to claim 1, wherein said one-piece configuration is fabricated from a clear material with rigidity and resilience.

5. A protective cover for use with a flame detector according to claim 1, wherein said one-piece configuration is fabricated from polyvinyl chloride (PVC).

6. A protective cover for use with a flame detector according to claim 1, wherein said one-piece configuration comprises a coating of an anti-static agent.

7. A protective cover for use with a flame detector according to claim 6, wherein said anti-static agent is "ORVIS®-K."

8. An apparatus for flame detection within a given monitored area, further comprising:

a flame detector disposed within a housing having a viewing window, said flame detector comprising a sensor array with wide spectrum sensitivity including visible band, near band infrared, and wide infrared spectrums for detecting any ignition within said monitored area; and a protective cover for use with said flame detector and for preventing accumulation of paint, grime or the like on said viewing window that may impact said wide spectrum sensitivity of said flame detector, said protective cover having wide spectrum transmittance characteristics that match the wide spectrum sensitivity of said flame detector.

9. An apparatus according to claim 8, wherein said protective cover further comprises:

a one-piece configuration shaped to completely surround said viewing window.

10. An apparatus for flame detection within a given monitored area according to claim 8, wherein said one-piece configuration further comprises:

a cylindrical portion with a groove running along its circumference; and a flange located at a base of said circular portion with a plurality of reinforcing members.

11. An apparatus for flame detection within a given monitored area according to claim 8, wherein said wide spectrum transmittance characteristics of said one-piece configuration accommodate transmission of radiant energy including visible and infrared (IR) within a range of 700 nanometers to 5 nanometers.

12. An apparatus for flame detection within a given monitored area according to claim 8, wherein said one-piece configuration is fabricated from a clear material with rigidity and resilience.

13. An apparatus for flame detection within a given monitored area according to claim 8, wherein said one-piece configuration is fabricated from polyvinyl chloride (PVC).

14. An apparatus for flame detection within a given monitored area according to claim 8, wherein said one-piece configuration comprises a coating of an anti-static agent.

15. An apparatus for flame detection within a given monitored area according to claim 14, wherein said anti-static agent is "ORVIS®-K."

16. An apparatus for flame detection with a given monitored area according to claim 8, further comprising:

a computer for processing data on radiant energy supplied by said sensor array.

* * * * *